(12) United States Patent
Weber et al.

(10) Patent No.: US 10,962,806 B2
(45) Date of Patent: *Mar. 30, 2021

(54) BLUE EDGE FILTER OPTICAL LENS

(71) Applicant: 3M INNOVATIVE PROPERTIES COMPANY, St. Paul, MN (US)

(72) Inventors: Michael F. Weber, Shoreview, MN (US); James E. Watson, Maplewood, MN (US); Mark R. Strenger, Woodbury, MN (US); Stephen A. Johnson, Woodbury, MN (US); Chad R. Wold, West Lakeland, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 217 days.

This patent is subject to a terminal disclaimer.

(21) Appl. No.: 15/850,334

(22) Filed: Dec. 21, 2017

(65) Prior Publication Data

US 2018/0113328 A1    Apr. 26, 2018

Related U.S. Application Data

(63) Continuation of application No. 14/091,555, filed on Nov. 27, 2013, now Pat. No. 9,885,885.

(51) Int. Cl.
*G02C 7/10* (2006.01)
*G02B 5/28* (2006.01)

(52) U.S. Cl.
CPC .............. *G02C 7/107* (2013.01); *G02B 5/28* (2013.01); *G02B 5/282* (2013.01); *G02B 5/283* (2013.01); *G02C 7/10* (2013.01)

(58) Field of Classification Search
CPC .......... G02B 5/28; G02B 5/282; G02B 5/283; G02C 7/10; G02C 7/107
See application file for complete search history.

(56) References Cited

U.S. PATENT DOCUMENTS

| | | | |
|---|---|---|---|
| 4,896,928 | A | 1/1990 | Perilloux et al. |
| 5,218,386 | A | 6/1993 | Levien |
| 5,646,781 | A | 7/1997 | Johnson, Jr. |
| 5,882,774 | A | 3/1999 | Jonza |
| 5,922,246 | A | 7/1999 | Matsushita |
| 6,096,375 | A | 8/2000 | Ouderkirk |

(Continued)

FOREIGN PATENT DOCUMENTS

| | | |
|---|---|---|
| WO | WO 2008/067109 | 6/2008 |
| WO | WO 2008/088939 | 7/2008 |

(Continued)

OTHER PUBLICATIONS

Albrecht, "Timing to Perfection: The Biology of Entral and Peripheral Circadian Locks", Neuron, Apr. 2012, vol. 74, No. 2, pp. 246-260.

(Continued)

*Primary Examiner* — William R Alexander
*Assistant Examiner* — Ephrem Z Mebrahtu

(57) ABSTRACT

Optical lenses are described and include a polymeric interference filter disposed on a curved polymeric substrate. The optical lens has an average light transmission of less than 2% across a band of blue light from 400 nm to at least 420 and up to 440 nm and substantially transmits blue light greater than 450 nm.

17 Claims, 6 Drawing Sheets

(56) References Cited

U.S. PATENT DOCUMENTS

| | | | |
|---|---|---|---|
| 6,145,984 | A | 11/2000 | Farwig |
| 6,157,490 | A | 12/2000 | Wheatley |
| 6,350,275 | B1 | 2/2002 | Vreman |
| 6,531,230 | B1 | 3/2003 | Weber |
| 6,676,859 | B2 | 1/2004 | Hartley |
| 6,783,349 | B2 | 8/2004 | Neavin |
| 6,926,405 | B2 * | 8/2005 | Ambler .............. G02B 5/23 |
| | | | 351/159.63 |
| 6,927,900 | B2 * | 8/2005 | Liu .................. B32B 17/10 |
| | | | 359/359 |
| 6,955,430 | B2 | 10/2005 | Pratt |
| 6,974,850 | B2 | 12/2005 | McMan |
| 7,106,509 | B2 | 9/2006 | Sharp |
| 7,118,438 | B2 | 10/2006 | Ouderkirk |
| 7,123,418 | B2 | 10/2006 | Weber |
| 7,138,173 | B2 | 11/2006 | Wheatley |
| 7,255,435 | B2 | 8/2007 | Pratt |
| 7,372,640 | B2 | 5/2008 | Fung |
| 7,506,977 | B1 | 3/2009 | Aiiso |
| 7,791,687 | B2 | 9/2010 | Weber |
| 8,120,730 | B2 | 2/2012 | Weber |
| 8,403,478 | B2 | 3/2013 | Ishak |
| 2006/0092374 | A1 | 5/2006 | Ishak |
| 2007/0216861 | A1 | 9/2007 | Ishak |
| 2008/0291541 | A1 | 11/2008 | Padiyath |
| 2010/0149483 | A1 | 6/2010 | Chiavetta, III |
| 2011/0063726 | A1 * | 3/2011 | Ramstad ......... G02B 27/2207 |
| | | | 359/464 |
| 2011/0272849 | A1 | 11/2011 | Neavin |
| 2012/0075577 | A1 | 3/2012 | Ishak |
| 2012/0120515 | A1 | 5/2012 | Ishak |
| 2012/0229893 | A1 | 9/2012 | Hebrink |
| 2013/0141693 | A1 * | 6/2013 | McCabe ......... B29C 45/14778 |
| | | | 351/159.56 |
| 2014/0233105 | A1 * | 8/2014 | Schmeder ............. G01J 3/465 |
| | | | 359/590 |
| 2014/0268031 | A1 | 9/2014 | Ambler |
| 2014/0300857 | A1 | 10/2014 | Cohen-Tannoudji |
| 2015/0002809 | A1 | 1/2015 | Cohen Tannoudji |
| 2015/0146166 | A1 | 5/2015 | Weber |

FOREIGN PATENT DOCUMENTS

| | | |
|---|---|---|
| WO | WO 2011-141840 | 11/2011 |
| WO | WO 2011-146288 | 11/2011 |

OTHER PUBLICATIONS

Brainard, "Action Spectrum for Melatonin Regulation in Humans: Evidence for a Novel Circadian Photoreceptor", The Journal of Neuroscience, Aug. 2001, vol. 21, No. 16, pp. 6405-6412.

Dijk, "Amplitude reduction and phase shifts of melatonin, cortisol, and other circadian rhythms after a gradual advance of sleep and light exposure in humans", Plos one, Feb. 2012, vol. 7, No. 2, pp. 1-15.

Hanifin, "Photoreception for circadian, neuroendocrine, and neurobehavioral regulation", Journal of Physiological Anthropology, Apr. 2007, vol. 26, No. 2, pp. 87-94.

Mann, "Can't sleep? It could be your iPad", CBS Minnesota, Presented on Sep. 4, 2012, [retrieved form the internet on Jan. 20, 2014] URL <http://minnesota.cbslocal.com/2012/09/04/cant-sleep-it-could-be-your-ipad/>, 2 pages.

Meijer, "Light Responsiveness and Photic Entrainment of the Mammalian Circadian Clock", The Visual Neurosciences, 625-640 (2003).

Morin, "The Circadian Visual System", Brain Research Reviews, Jan. 1994, vol. 19, No. 1, pp. 102-127.

Nevitt, "Recent advances in Multilayer Polymeric Interference Reflector products", Thin Solid Films, Apr. 2013, vol. 532, pp. 106-112.

Santhi, "The Spectral Composition of Evening Light and Individual Differences in the Suppression of Melatonin and Delay of Sleep in Humans", Journal of Pineal Research, Aug. 2012, vol. 53, No. 1, pp. 47-59.

Skene, "Optimization of Light and Melatonin to Phase Shift Human Circadian Rhythms", Journal of Neuroendocrinology, Apr. 2003, vol. 15, No. 4, pp. 438-441.

Tarkan, "Aging of Eyes is Blamed for Range of Health Woes", published on Feb. 20, 2012, [retrieved on Feb. 7, 2014], URL <http://www.nytimes.com/2012/02/21/health/aging-of-eyes-is-blamed-in-circadian-rhythm-disturbances.html>; 3 pages.

West, "Blue light from light-emitting diodes elicits a dose-dependent suppression of melatonin in humans" Journal of Applied Physiology, Mar. 2011, vol. 110, No. 3, pp. 619-626.

PCT International Search Report for PCT/US2014/066275, dated Feb. 10, 2015.

\* cited by examiner

- violet reflector
— blue reflector

— UV blocker
-o- modeled MOF T

BLUE EDGE FILTER OPTICAL LENS

FIELD

The disclosure relates to a blue edge filter optical lens and, in particular, to an optical lens that blocks short wavelength blue light while maintaining a color balanced white transmission.

BACKGROUND

The hazards of ultraviolet light to the eye are known. Ultraviolent radiation is within a range of wavelengths below visible light and generally from 100 to 400 nanometers (nm). Most corrective eyewear and sunglasses only block light below about 400 nm, however it has been found that deep blue light or short wavelength blue light from 400 to 440 nm can also damage the eye.

Blue light absorbing dyes have been utilized with protective eyewear in order to block deep blue light or short wavelength blue light from 400 to 440 nm. These blue light absorbing dyes have an absorption tail that extends to cover much of the longer wavelength blue light spectrum creating a lens with an unacceptable yellow appearance.

BRIEF SUMMARY

The disclosure relates to blue edge filter eyewear and, in particular, to an optical lens that blocks short wavelength blue light while maintaining a color balanced white transmission. The optical lens includes a polymeric interference filter that creates a sharp band edge to provide for quick transitions from low to high transmission of light as a function of wavelength.

In many embodiments, an optical lens includes a curved polymeric substrate and a polymeric interference filter disposed on the curved polymeric substrate. The optical lens has an average light transmission of less than 2% across a band of blue light having a short wavelength band edge of about 400 nm or less and a long wavelength band edge in a range from 420 to 440 and substantially transmits blue light having a wavelength that is 10 nm or greater than the long wavelength band edge.

In further embodiments, an optical lens includes a curved polymeric substrate and a polymeric interference filter disposed on the curved polymeric substrate. The optical lens has an average light transmission of less than 2% across a band of blue light from 400 nm to 420 nm and substantially transmits blue light greater than 430 nm.

In a further aspect, an optical lens includes a curved polymeric substrate and a multilayer optical infrared reflecting film disposed on the curved polymeric substrate. The multiplayer optical infrared reflecting film has a third order harmonic reflecting a band of blue light in a range from 400 to 440 nm and substantially transmits blue light greater than 450 nm.

In a further embodiment, an optical lens includes a spherically curved polymeric substrate and a polymeric bandstop filter disposed on the spherically curved polymeric substrate. The polymeric bandstop filter reflects a band of yellow light having a FWHM of less than 40 nm and a 1% floor of the reflected band of yellow light having a width being greater than one half of the FWHM value.

In a further embodiment, an optical lens includes a spherically curved polymeric substrate and a polymeric interference filter disposed on the spherically curved polymeric substrate. The polymeric interference filter reflects a band of visible light having a FWHM of less than 40 nm and a 1% floor of the reflected band of visible light having a width being greater than one half of the FWHM value.

The details of one or more embodiments of the disclosure are set forth in the accompanying drawings and the description below. Other features, objects, and advantages of the disclosure will be apparent from the description and drawings, and from the claims.

BRIEF DESCRIPTION OF THE DRAWINGS

The disclosure may be more completely understood in consideration of the following detailed description of various embodiments of the disclosure in connection with the accompanying drawings, in which.

Figure 1:
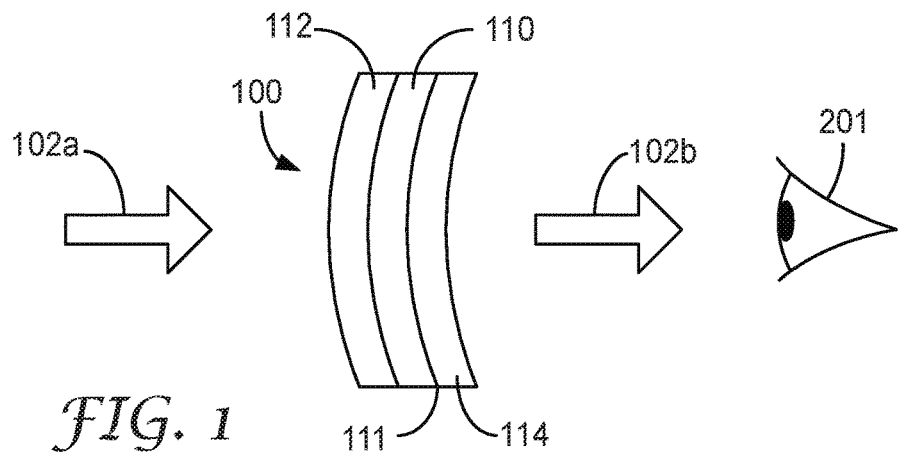
FIG. 1 is a schematic diagram side view of an optical lens filtering light observed by an individual.

The schematic drawings presented herein are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION

In the following detailed description, reference is made to the accompanying drawings that form a part hereof, and in which are shown by way of illustration several specific embodiments of devices, systems and methods. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

Any direction referred to herein, such as "top," "bottom," "left," "right," "upper," "lower," "above," "below," and other directions and orientations are described herein for clarity in reference to the figures and are not to be limiting of an actual device or system or use of the device or system. Many of the devices, articles or systems described herein may be used in a number of directions and orientations.

The phrase "substantially reflects" refers to transmitting less than 2% of light incident on the element.

The phrase "substantially transmits" refers to transmitting at least 50% of light incident on the element.

The phrase "blue light" refers to light having a wavelength in a range from 400 to 500 nm.

The phrase "violet light" refers to light having a wavelength in a range from 400 to 420 nm.

The phrase "ultraviolet light" refers to light having a wavelength of less than 400 nm or in a range from 100 to 400 nm and "near ultraviolet light" refers to light having a wavelength in a range from 300 to 400 nm.

The disclosure relates to blue edge filter eyewear and, in particular, to an optical lens that blocks short wavelength blue light while maintaining a color balanced white transmission. The optical lens includes a polymeric interference filter that creates a sharp band edge to provide for quick transitions from low to high transmission of light as a function of wavelength. The polymeric interference filter can be an infrared reflecting film having a higher order harmonic reflecting a band of blue light. The optical lens can block (T is less than 10%) blue light up to 440 nm and transmit (T is greater than 50%) blue light greater than 460 nm or 450 nm. A band of yellow light can be blocked to improve the white balance of the light transmitted through the lens. A UV absorber can be included to block 400 nm or less light wavelengths. In another embodiment the polymeric filter reflects a band of yellow light. Polymeric bandstop filters are described that reflect a band of visible or yellow light having a FWHM of less than 40 nm and a 1% floor of the reflected band of visible or yellow light having a width being greater than 20 nm or greater than one half the FWHM value. Composite laminates of these polymeric filters between polymeric spherically curved lenses are also described. While the present disclosure is not so limited, an appreciation of various aspects of the disclosure will be gained through a discussion of the examples provided below.

Desirable filtering properties of these optical lenses (particularly for eyewear) include a strong rejection band having a longer wavelength band edge in a range from 420 to 440 nm and a shorter wavelength band edge around 400 nm or less and optionally a strong but narrow rejection band between 550 and 600 nm (to maintain a white balance), and relatively high transmission at other visible wavelengths so that the filter or optical lens does not have an undesirable or yellow appearance. These polymeric interference filters desirably have a transition from substantially reflecting or blocking light (T<2%) to substantially transmitting light (T>50%) within a wavelength range of 10 nm or less. Although such filtering properties may theoretically be obtained solely with absorptive materials such as dyes and pigments, absorptive materials alone are unable to provide a sufficiently narrow and strong rejection bandwidth needed to obtain the color balanced white transmission desired. In contrast, the polymeric multilayer optical films (polymeric interference filters) can be tailored to have strong blocking (very low transmission, with correspondingly high reflection) at a wavelength of interest, and in a narrow band.

In addition these polymeric interference filters or lenses described herein can incorporate broadband absorbers such as black, grey, or color tinted grey pigments that lower the overall transmission of the lens for use as sunglasses. In such cases, the lenses or the filter can have an average transmission of 40%, 30% or 20% or less. In this case the 50% transmission value is defined as 50% of the value B illustrated in FIG. 2. In a preferred embodiment the grey tint is provided as a polarizing dye or as a reflective polarizer, or a combination of an absorptive and reflective polarizer. Combined absorbing and reflecting polarizers are described in U.S. Pat. Nos. 6,096,375, 7,791,687, and 8,120,730.

The transmissive and reflective properties of multilayer optical films are based on constructive or destructive interference of light at interfaces of (typically) tens, hundreds, or thousands of individual microlayers in one or more layer stacks. By appropriate selection of materials, processing conditions, and thicknesses for the microlayers, the transmission spectrum can be tailored to provide a strong but narrow reflection band, hence strong blocking in a narrow band of blue light, violet light, yellow light, or combinations thereof. The narrower the blue blocking band is in wavelength space (while still being spectrally wide enough to block harmful blue light wavelengths), the less light needs to be blocked in the yellow portion of the spectrum to provide an improved color balance.

FIG. 1 is a schematic diagram side view of an optical lens 100 filtering light observed by an individual 201. The optical lens 100 includes a curved polymeric substrate 112, 114 and a polymeric interference filter 110 disposed on the curved polymeric substrate. While the polymeric interference filter 110 is illustrated separating a first curved polymeric substrate 112 from a second curved polymeric substrate 114, it is understood that the polymeric interference filter 110 can be disposed on only one curved polymeric substrate, as desired. In addition it is understood that an adhesive can fix the polymeric interference filter 110 to either or both of the first curved polymeric substrate 112 and second curved polymeric substrate 114. The curved polymeric substrates 112, 114 can be spherically curved as is utilized in eyewear for corrective or sunglasses, for example.

The polymeric interference filter 110 receives incident light 102a and filters selected wavelengths of the light to provide filtered light 102b. The filtered light 202b is perceived by the eyes of an individual 201. The effect of the polymeric edge filter 110, if designed properly, is to substantially block harmful blue light while simultaneously providing a color balanced white transmission.

In some embodiments the optical lens 100 has an average light transmission of less than 2% or less than 1% across a band of blue light from 400 nm to at least 420 nm or up to 440 nm and substantially transmits blue light greater than 450 nm. In some of these embodiments the optical lens 100 has an average light transmission of less than 1% or less than 0.1% across a band of light from 300 nm to 440 nm and transmits at least 50% or at least 70% of all blue light greater than 450 nm. In some embodiments the polymeric interference filter 110 reflects at least 99% of all blue light in a range from 420 to 440 nm, from 415 to 440 nm, from 410 to 440 nm, or from 400 to 440 nm and transmits at least 50% or at least 70% of all blue light greater than 450 nm. In other embodiments the polymeric interference filter 110 reflects at least 99% of all blue light in a range from 400 to 420 nm, from 400 to 430 nm, from 400 to 435 nm, or from 400 to 440 nm and transmits at least 50% or at least 70% of all blue light greater than 450 nm. In these embodiments, the optical lens 100 or polymeric interference filter 110 substantially transmits at least 50% of blue light at wavelengths greater than 10 nm longer than the range of blue light being substantially reflected or substantially blocked.

The polymeric interference filter 110 may reflect all the light within the band of blue light from 400 nm to at least 420 nm or up to 440 nm or an absorbing dye can be utilized in combination with the polymeric interference filter 110 to block (reflect or absorb) all the light within the band of blue light from 400 nm to at least 420 nm or up to 440 nm or from 300 to at least 420 nm or up to 440 nm. For example the absorbing dye can absorb deep blue light, violet light, ultraviolet light or combinations thereof and can be utilized in combination with a polymeric interference filter 110 reflecting blue light, as illustrated in the Examples below.

In other embodiments the optical lens 100 has an average light transmission of less than 2% or less than 1% across a band of blue light from 400 nm to 420 nm and substantially transmits blue light greater than 430 nm. In these embodiments the polymeric interference filter 110 reflects at least 99% of all blue light in a range from 400 to 420 nm and transmits at least 50% or at least 70% of all blue light greater than 430 nm. In some of these embodiments the optical lens 100 has an average light transmission of less than 1% across a band of blue light from 300 nm to 420 nm and transmits at least 50% or at least 70% of all visible light greater than 430 nm. Although the filter may transmit 50% or 70% of all visible light greater than 430 nm, other components of the lens may only transmit less than 40%, 30% or 20% of all visible light greater than 430 nm when the lens is used, e.g., for sunglasses. A UV absorbing material or dye can be optionally included in the optical lens or on the polymeric interference filter the in these embodiments.

In preferred embodiments the polymeric interference filter 110 is a multilayer optical infrared reflecting film. The multilayer optical infrared reflecting film 110 has a higher order harmonic (second, third, fourth, fifth, sixth, etc.) reflecting a band of blue light in a range from 400 to 440 nm and substantially transmitting blue light greater than 450 nm. The optical lens can have an average light transmission of less than 2% or less than 1% across a band of blue light from 400 nm to at least 420 or up to 440 nm and substantially transmits blue light greater than 450 nm. In some embodiments the multilayer optical infrared reflecting film 110 reflects at least 99% of all blue light in a range from 420 to 440 nm, from 415 to 440 nm, from 410 to 440 nm, or from 400 to 440 nm and transmits at least 50% or at least 70% of all blue light greater than 450 nm. In other embodiments the multilayer optical infrared reflecting film 110 reflects at least 99% of all blue light in a range from 400 to 420 nm, from 400 to 430 nm, from 400 to 435 nm, or from 400 to 440 nm and transmits at least 50% or at least 70% of all blue light greater than 450 nm. The multilayer optical infrared reflecting film 110 may reflect all the light within the selected band of blue light from 400 nm to 440 nm or an absorbing dye can be utilized in combination with the multilayer optical infrared reflecting film 110 to block (reflect or absorb) all the light within the band of blue light from 400 nm to at least 420 nm or up to 440 nm or from 300 to at least 420 nm or up to 440 nm, as described above. In these embodiments, the multilayer optical infrared reflecting film 110 substantially transmits at least 50% of blue light at wavelengths greater than 10 nm longer than the range of blue light being substantially reflected or substantially blocked.

The polymeric interference filter 110 described herein has a sharp band edge particularly at the long wavelength band edge (LWBE). In many embodiments light transmission goes from less than 1% to greater than 50% or greater than 70% within 10 nm or within 5 nm at the LWBE. This is particularly useful in blocking a selective range of light wavelengths while transmitting other visible light wavelengths to provide a desired color balanced transmission. For example blue light wavelengths up to 440 nm can be substantially reflected or blocked while substantially transmitting blue light of 445 nm or greater or 450 nm or greater. The shorter wavelengths of blue light are most damaging to eye tissue and the longer wavelengths of blue light are detected more easily by the eye via the well-known photopic curve. Therefore, a polymeric interference filter that blocks most light of wavelengths less than 440 nm and has high transmission for light of 450 nm and longer wavelengths respectively provide for a good tradeoff of eye protection and color rendition.

Depending on how much blue light is blocked by the optical lens 100, an amount of yellow light may need to be blocked in order to maintain a color balanced white transmission perceived by an observer 201. This yellow light can be absorbed with a dye or yellow light absorbing material or reflected with the polymeric interference filter 110.

The yellow light absorbing material 111 absorbs light mainly within a range from 560 to 600 nm. The yellow light absorbing material 111 can be disposed between the polymeric interference filter 110 and the curved polymeric substrate 114. In preferred embodiments the yellow light absorbing material 111 is disposed between the polymeric interference filter 110 and the observer 201. This is useful to reduce glare if the polymeric interference filter also includes a narrow reflection band for yellow light. Useful yellow light absorbing dyes include Epolight 5819 from Epolin Corporation and dyes ABS 584 and ABS 574 from Exciton Corp. The Epolight 5819 and the Exciton ABS 584 have absorption peaks near 584 nm and the ABS 574 has a peak absorption near 574 nm In some embodiments the optical lens 100 blocks a second band of light within a range from 560 to 600 nm and is less than 40 nm, less than 35 nm, less than 30 nm, or less than 25 nm wide (full height half maximum "FWHM" defined below).

In some embodiments the polymeric interference filter 110 is a polymeric bandstop filter 110 that reflects a band of yellow light within the range of 560 nm to 600 nm and has a light transmission greater than 50% or greater than 70% within 10 nm or within 5 nm of each side of the "floor" of the reflected band of yellow light. The floor can be defined as the maximum range of wavelengths over which the average transmission of the filter is less than or equal to 5% or 2% or 1%. The floor of filter 110 can be half as wide as the FWHM value, or greater. The sharper the band edges, the closer the width of the floor is to the FWHM value. In many embodiments the reflected band of yellow light is less than 40 nm, less than 35 nm, less than 30 nm, or less than 25 nm wide (FWHM) and transmits less than 1% of light within the reflected floor band and having a floor width that is at least 50% or at least 60% or at least 70% of FWHM. In many of these embodiments the reflected band of yellow light extends between a long wavelength band edge (LWBE) and a short wavelength band edge (SWBE) which are defined as points p1 and p2 in FIG. 2. The polymeric bandstop filter 110 has a light transmission greater than 70% or greater than 80% within 10 nm or within 5 nm of each of the LWBE and SWBE.

As illustrated in the Examples below, the polymeric interference filter 110 can have one or more light rejection bands. In some embodiments the polymeric interference filter 110 includes both a blue light and a yellow light rejection band. In preferred embodiments these blue and yellow light rejection bands are higher order harmonics of an infrared light reflecting polymeric interference filter 110.

In many embodiments, an optical lens includes a spherically curved polymeric substrate and a polymeric bandstop filter disposed on the spherically curved polymeric substrate. The term "spherical" refers to a three dimensional curved surface and includes common surfaces of revolution that are similar to spheres such as ellipsoids and paraboloids, as well as the aspheric shapes commonly found in lineless bifocals.

The polymeric bandstop filter reflects a band of visible or yellow light having a FWHM of less than 40 nm and a 5%, or 2%, or 1% floor of the reflected band of visible or yellow light having a width being greater than 20 nm or greater than 25 nm or greater than one half the FWHM value. The floor can be defined as the maximum range of wavelengths over which the average transmission of the filter is less than or equal to 5% or 2% or 1%. For example, the polymeric bandstop filter reflects a band of visible or yellow light having a FWHM of less than 40 nm and a 5% floor of the reflected band of visible or yellow light having a width being greater than 20 nm or greater than 25 nm or greater than one half the FWHM value. In other examples the polymeric bandstop filter reflects a band of visible or yellow light having a FWHM of less than 40 nm and a 2% floor of the reflected band of visible or yellow light having a width being greater than 20 nm or greater than 25 nm or greater than one half the FWHM value. In further examples, the polymeric bandstop filter reflects a band of visible or yellow light having a FWHM of less than 40 nm and a 1% floor of the reflected band of visible or yellow light having a width being greater than 20 nm or greater than 25 nm or greater than one half the FWHM value.

In some embodiments reflecting yellow or green light, the reflected band of light is in a range from 560 to 600 nm or from 530 to 570 nm respectively and the 1% floor of light within a floor band having a width being greater than 20 nm or greater than 25 nm or greater than one half the FWHM value.

Figure 2:
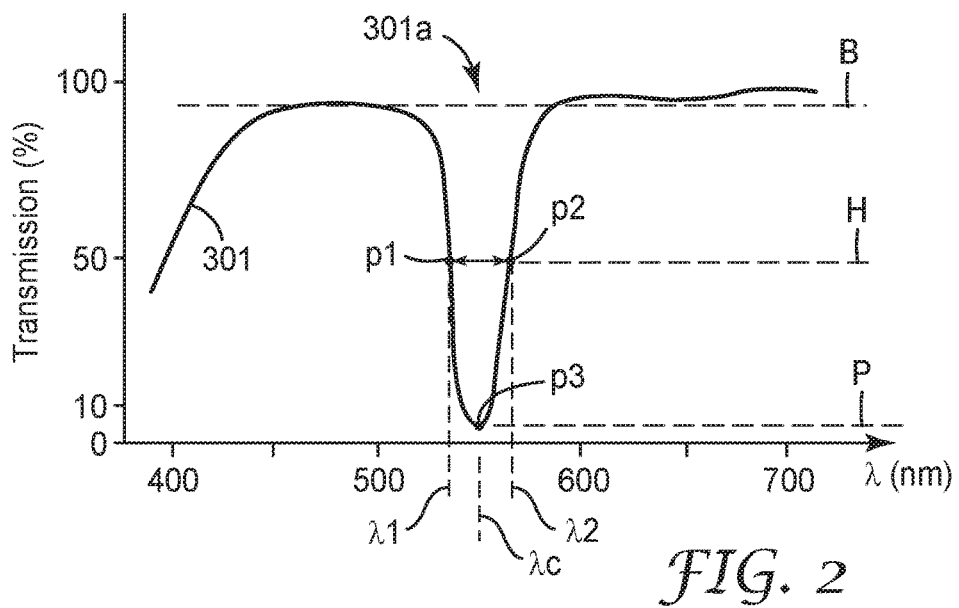
FIG. 2 is a graph of the transmission spectrum of a hypothetical filter and illustrating the concept of full width half maximum.

FIG. 2 is a graph of the transmission spectrum of a hypothetical filter and illustrating the concept of full width half maximum ("FWHM"). The transmission properties of a hypothetical filter, or of one or more components thereof such as a multilayer optical film, are shown in FIG. 2. In this figure, percent transmission is plotted against optical wavelength $\lambda$ in nanometers, the wavelength axis extending over the range from 400 to 700 nm, which is sometimes treated as the human visible wavelength range. The curve 301 may represent the measured transmission of the entire filter, or of one or more individual components thereof, at normal incidence or another design angle of incidence. Without loss of generality, for the remainder of the discussion of this FIG. 2, assume for simplicity that the curve 301 represents the transmission of the entire filter (note however that the filter may in some cases be only a multilayer optical film). The illustrated filter selectively blocks light within a narrow band in a portion of the green region of the visible spectrum, evidenced by the low transmission of the rejection band 301*a* of the curve 301. The rejection band 301*a* may be a reflection band, an absorption band, or the combination of a reflection band and an absorption band.

In order to quantify relevant features of the curve 301, we identify a baseline value B of the curve 301, a peak value P of the curve 301 (in this case the peak value P corresponds to a transmission minimum for the rejection band 301*a*, shown at point p3), and an intermediate value H of the curve 301, halfway between P and B. The curve 301 intersects with the value H at the points p1 and p2, whose wavelength values equal the short wavelength band edge $\lambda 1$ and the long wavelength band edge $\lambda 2$, respectively, of the rejection band 301*a*. The short and long wavelength band edges can be used to calculate two other parameters of interest: the width (full width at half-maximum, or "FWHM") of the rejection band 301*a*, which equals $\lambda 2 - \lambda 1$; and the center wavelength $\lambda c$ of the rejection band 301*a*, which equals $(\lambda 1 + \lambda 2)/2$. Note that the center wavelength $\lambda c$ may be the same as or different from the peak wavelength (see point p3) of the rejection band 301*a*, depending on how symmetrical or asymmetrical the rejection band 301*a* is.

The transmission of the filter (or component(s) thereof) refers generally to the transmitted light intensity divided by the incident light intensity (for light of a given wavelength, incident direction, etc.), but may be expressed in terms of "external transmission" or "internal transmission". The external transmission of an optical element is the transmission of the optical element when immersed in air, and without making any corrections for Fresnel reflections at the air/element interface at the front of the element or for Fresnel reflections at the element/air interface at the back of the element. The internal transmission of an optical element is the transmission of the element when the Fresnel reflections at its front and back surfaces have been removed. The removal of the front and back Fresnel reflections may be done either computationally (e.g. by subtracting an appropriate function from the external transmission spectrum), or experimentally. For many types of polymer and glass materials, the Fresnel reflections are about 4 to 6% (for normal or near-normal angles of incidence) at each of the two outer surfaces, which results in a downward shift of about 10% for the external transmission relative to the internal transmission. FIG. 2 does not specify which of these transmissions is used, hence, it may generally apply to either internal or external transmission. If transmission is referred to herein without being specified as internal or external, the reader may assume the transmission refers to external transmission, unless otherwise indicated by the context. In many eyewear lenses, the application of surface anti-reflection coatings may result in Tinternal≈Texternal.

Figure 3:
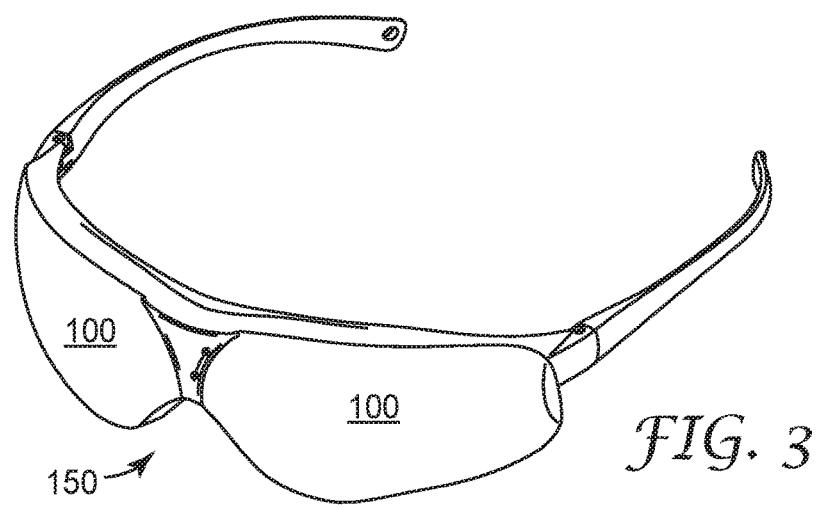
FIG. 3 is a perspective view of illustrative eyewear utilizing the optical lenses described herein.

FIG. 3 is a perspective view of illustrative eyewear 150 utilizing the optical lenses 100 described herein. It is understood that the eyewear 150 can have any useful configuration. These optical lenses can be formed by injection molding at elevated temperatures of 200 degrees centigrade or higher and have a thickness of 2 mm or greater. It is surprising found that forming the optical lenses described herein at these high temperatures does not degrade the optical reflection properties of the polymeric multilayer interference filters described herein.

Multilayer polymeric light reflectors described herein can be fabricated to reflect various narrow bands of violet, blue and yellow light. The reflective films can be made by a continuous process of coextrusion of alternating low and high index polymeric materials and stretching the resulting multilayer polymer web, e.g. as described in U.S. Pat. No. 5,882,774 (Jonza et al.), U.S. Pat. No. 6,531,230 (Weber et al.), and U.S. Pat. No. 6,783,349 (Neavin et al.). The layer thickness profiles were tailored to provide a multilayer optical film that operates as a narrow band reflector, for example, whereby light within the narrow band of wavelengths is highly reflected (with correspondingly low transmission) and light outside of the narrow band of wavelengths is highly transmitted (with correspondingly low reflection). In order to obtain sharpened bandedges, the layer thickness profiles are graded similar to those discussed in U.S. Pat. No. 6,157,490 (Wheatley et al.), and higher order harmonic bands were used as described in U.S. Pat. No. 6,531,230, as well as in a recent publication by T. J. Nevitt and M. F. Weber "Recent advances in Multilayer Polymeric Interference Reflectors" in Thin Solid Films 532 (2013) 106-112.

Multilayer optical films having a narrow reflection band can be made by co-extruding polymer resin layers so as to form relatively narrow reflection bands. The use of highly birefringent materials such as a polyester, in combination with a low refractive index material such as an acrylic, provide for useful refractive index differences between alternating layers which then provide for high reflectivity in the reflection band. Several options exist for making these reflectors. In some cases, the layer thickness profile of the microlayers can be tailored to provide a first-order reflection band (at normal incidence) at a desired visible wavelength. In other cases, the microlayers can be made thicker such that the first-order reflection band at normal incidence is at an infrared wavelength, but a high order harmonic (e.g., a $2^{nd}$, $3^{rd}$, or $4^{th}$ order harmonic) of the infrared band is at the desired visible wavelength. This latter design approach, and subsequent polymer processing techniques, are discussed in U.S. Pat. No. 6,531,230 (Weber et al.).

Assuming relatively small index differentials, such as those available with polymeric mirrors, the reflective power of a given reflectance order of a multilayer stack is inversely proportional to the order number, and it depends greatly on the f-ratio (defined below). The reflective power of a given harmonic band of a multilayer interference reflector is defined as the area under the optical density spectrum of the given band, i.e. the area under the spectral curve of –Log(T) vs. wavelength, normalized for wavelength and after removal of the effects of reflection at the polymer air surfaces (surface reflections are approximately 12% (6% for each surface) for out-of-band wavelengths when PET skin layers are present). For narrow band reflectors, the various higher order harmonics do not overlap and each order has a distinct reflection band and the reflective power can easily be measured. Thus, depending on the number of layers and the materials that one desires to use in the reflector, a given higher order band may not have high enough reflective power to provide the desired reflectivity for a given wavelength range. In that case a lower order reflective band can be used, although the band edges may not be as sharp, i.e. as steep, as a higher order band. The limiting sharpness, or slope of a band edge is inversely proportional to the intrinsic bandwidth (IBW) of a quarterwave stack, which is well known in the art to be given by:

$$IBW = \sin^{-1}[(n_h - n_l)/(n_h + n_l)] \text{ or simply } IBW \approx (n_h - n_l)/(n_h + n_l) \text{ for small index differentials.}$$

For the various higher order harmonic reflection bands, the effective index differential, and therefore the IBW, is reduced by the absolute value of $\sin[n*Pi*f]/n$ where n is the order number and f is the f-ratio.

A $1^{st}$ order reflection band of a given thickness graded multilayer stack can have the same bandedge slope as a third order reflection band of a second material stack if the index differential of the former is one third that of the latter. Alternatively, the effective index differential of a given high and low index material pair can be reduced simply by changing the f-ratio of the layer pair.

The f-ratio of an interference stack is given by f-ratio= $(n_h*d_h)/(n_h*d_h + n_l*d_l)$ where $n_h$ and $n_l$ are the values of the high and low indices of refraction of a layer pair in the stack and $d_h$ and $d_l$ are their thicknesses. Note that in a stack having a graded layer thickness distribution, the low and the high index layer thickness distributions should be graded equally in order to maintain a constant f-ratio throughout the stack.

With 275 layers of PET and coPMMA, there is sufficient reflective power in the 3rd, 4th and 5th order harmonic bands that are illustrated in the examples. Thus, sharper band edges and acceptable reflectivity and bandwidth are generally achievable with several of the higher order bands of PET/coPMMA multilayers that can be fabricated with equipment that is known in the art. The use of higher order bands to achieve sharp band edges with inorganic vapor deposited quarter wave stacks is in general very rare for two reasons: the large index differential of the inorganic material pairs with the subsequent low number of layers produces wide bands with relatively low sloped band edges, and the different approach to stack design wherein automatic computerized stack design prescribes the thickness of each layer using a search algorithm which returns a seemingly random variation of layer thickness. In the latter, it is difficult to say whether the stack is of any given order, although many thickness values are near the first order values. In addition, the deposition of inorganic coatings typically require high substrate temperatures. Furthermore, the coating cannot be subsequently thermoformed along with the substrate, i.e., the coating must be applied to individual lenses after they are formed to the desired curvature. A uniform coating is difficult to achieve on a curved substrate, particularly a spherically curved substrate, especially in mass production onto large arrays of lenses.

EXAMPLES

The multilayer reflectors in the following examples were made with stacks of 223 individual microlayers and with stacks of 275 individual microlayers, the microlayers alternating between PET and coPMMA polymer material. The coPMMA is a co-polymer of polymethyl methacrylate, the added polymer being ethyl acrylate of about 20% by weight. The coPMMA is purchased from Arkema, Inc. In all examples the layer thickness values of the stack were tailored to produce a first-order reflection band in the infrared region of the spectrum and the thickness values of the PET, and the PET to coPMMA thickness ratios were tailored, as described in U.S. Pat. No. 6,531,230 (Weber et al.) such that the various higher order harmonic bands reflect violet, blue or yellow light or combinations of blue and yellow or violet and yellow light. All multilayer film examples were coextruded with PET protective boundary layers and PET skin layers in addition to the microlayers. The approximate indices of PET are those commonly found in commercial PET films, i.e. about 1.65 for the in-plane indices and about 1.49 for the thickness direction index. The index of the coPMMA is 1.494. All indices were measured at a wavelength of 633 nm, using the instrument sold by the Metricon Corporation, Pennington N.J.

Example 1

Violet Light Reflector

Figure 4:
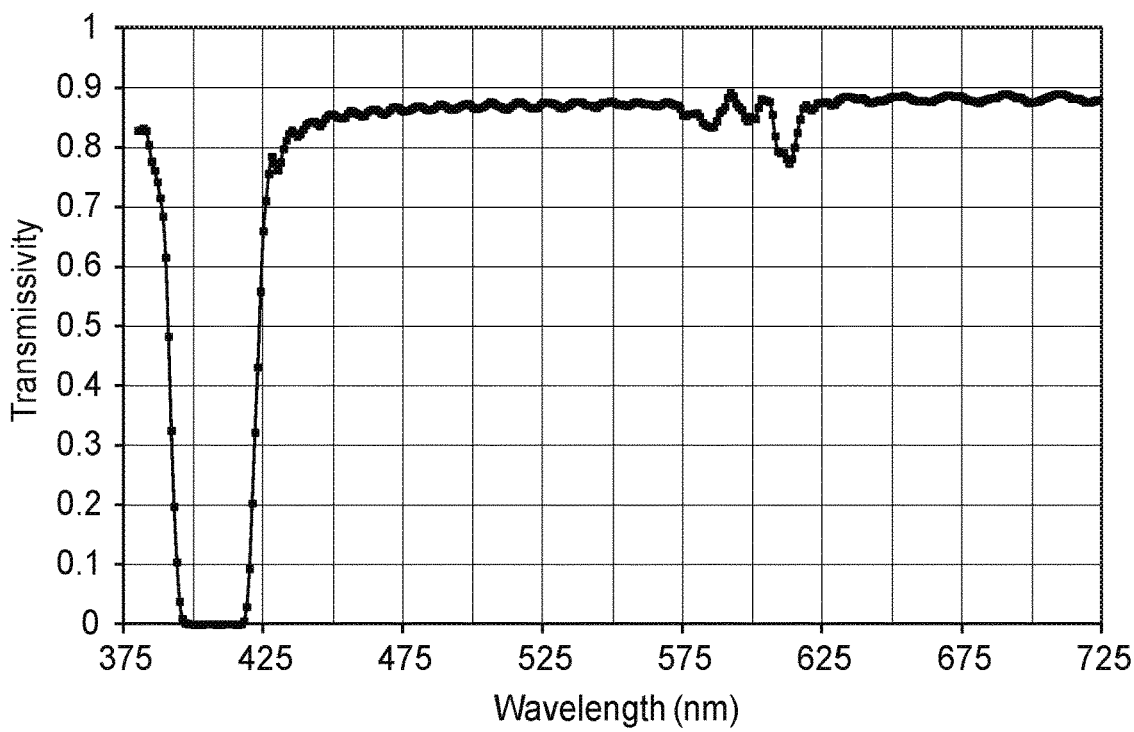
FIG. 4 is a graph of the measured transmission spectrum of a multilayer optical film having a reflection band blocking violet light.

A film with 275 alternating layers of PET and coPMMA was coextruded and oriented with an f-ratio of approximately 0.5 and narrow layer thickness range to give a narrow but highly reflective $3^{rd}$ order harmonic band in the violet region of the spectrum. A transmission spectrum of the film is plotted in FIG. 4. The FWHM of this band is about 31 nm. The transition from 5% T to 70% T for the long wavelength band edge (LWBE) is 6 nm wide. A weak $2^{nd}$ order reflection band is visible near 600 nm due to small deviations from the condition of f-ratio=0.50 for some of the layer pairs in the stack. The average transmission from 398 nm to 418 nm is 0.1 percent (average transmissivity=0.001 being a 0.1% floor) and the average transmission from 400 to 420 nm is 0.6%. The sharp band edge of this filter enables the blocking of greater than 99% of violet light without adding any noticeable yellow coloration to the film.

Although the film does block light that is visible to the human eye (380 nm to about 420 nm), this film appears essentially uncolored in sunlight and under fluorescent lights both in transmission and when placed on white paper. When placed on clear eyewear lenses, the lenses appear to be uncolored. This film thus can be incorporated in eyewear without the need for adding a color compensating dye or other wavelength blocker, although the latter can be added for reasons described below.

Further spectral details of this filter are given in Table 1.

TABLE 1

| | bandwidth | Avg Transmissivity | SWBE (nm) | LWBE (nm) |
|---|---|---|---|---|
| FWHM | 32 | 0.068 | 391 | 423 |
| 5% floor | 30 | 0.043 | 392 | 422 |
| 2% floor | 28 | 0.017 | 393 | 420 |
| 1% floor | 26 | 0.011 | 394 | 420 |
| 0.1% floor | 22 | 0.0011 | 396 | 418 |

Note that the 1% floor width is 26 nm, compared to 32 nm for the FWHM, for ratio of 0.81 or 81%.

Example 2

Violet and Blue (400 to 440 nm) Light Reflector

Figure 5:
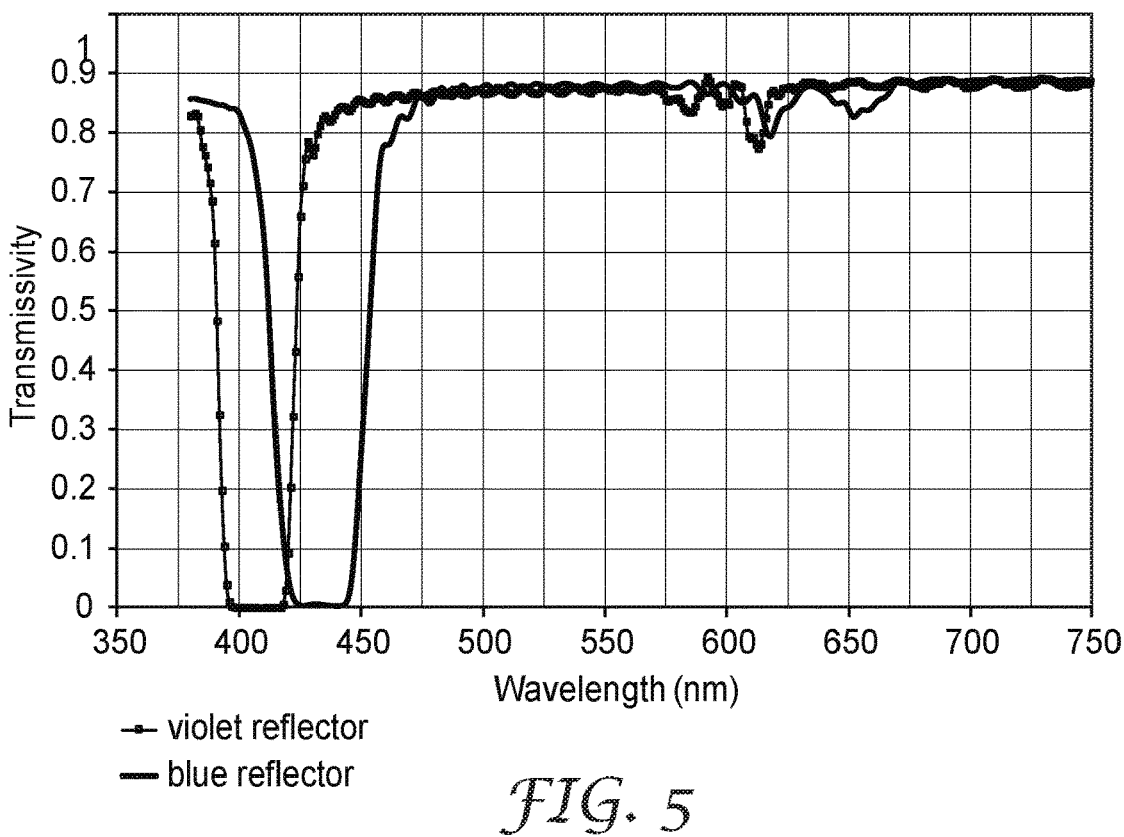
FIG. 5 is a graph of the measured transmission spectrum of a multilayer optical film having a reflection band blocking violet light and a reflection band reflecting blue light.

To provide for more protection from actinic radiation, the reflection band of Example 1 can be extended to block longer wavelengths of light beyond the violet portion of the spectrum. Extension of the blocking region to 430, 435 or 440 nm will increase the protection of the eye from macular degeneration. The spectrum can be extended by increasing the gradient of the layer thickness profile in the stack, or additional layers can be added to the stack, or a second independent stack can be added either by coextrusion or by laminating a separately formed stack to the first. Coextrusion of two different multilayer polymeric reflector stacks can be accomplished using the apparatus described in U.S. Patent Publication 2011/0272849 entitled "Feedblock for Manufacturing Multilayer Polymeric Films", filed May 7, 2010. The spectral plots in FIG. 5 show the spectra of Example 1 (violet reflector) and a spectrum of a second film (blue reflector) having a LWBE near 440 nm. The second film was formed is the same manner as described in Example 1 and has 223 alternating layers of PET and coPMMA. This second blue reflecting filter has an average transmission of 1% from 420 to 446 nm. The transmission at 445 nm is 2% and the transmission at 454 is 52%, thus providing for a reasonably sharp band edge. The position of this edge can be adjusted during film formation by adjusting the speed of the casting wheel or the extrusion rates of the polymer resins.

Further spectral details of the added blue reflecting filter are given in Table 2a.

TABLE 2a

| | bandwidth | Avg Transmissivity | SWBE | LWBE |
|---|---|---|---|---|
| FWHM | 40 | 0.093 | 413 | 453 |
| 5% floor | 34 | 0.044 | 416 | 450 |
| 2% floor | 29 | 0.019 | 419 | 448 |
| 1% floor | 26 | 0.010 | 420 | 446 |

The combined violet and blue reflecting filters provide for good blockage of blue light from 400 to 440 nm with high transmission of light for wavelengths greater than 450 nm.

The total transmission of the two laminated filters can be calculated using the formula:

$$R = \frac{R1 + R2*(1-2R1)}{1 - R1*R2}$$

where R1 and R2 are the reflectivities of the two individual filters. Each filter has two air/polymer surfaces and two of these would be removed by lamination or coextrusion. The mathematical formulation for removing this reflection is given in WO2011146288A1, page 38. The spectral details of the composite reflecting filter are given in Table 2b. The average % transmission from 400 to 440 nm is 0.5%. The LWBE for this edge filter is at 453 nm, and a transmission for 450 nm light can be made greater than 50% if desired by simply making the film and its constituent layers slightly thinner so as to move the band edge a few nm to shorter wavelengths.

TABLE 2b

| | bandwidth | Avg Transmissivity | SWBE (nm) | LWBE (nm) |
|---|---|---|---|---|
| FWHM | 62 | 0.052 | 391 | 453 |
| 5% floor | 61 | 0.045 | 392 | 453 |
| 2% floor | 56 | 0.019 | 393 | 449 |
| 1% floor | 53 | 0.010 | 394 | 447 |
| 400 to 440 | | 0.005 | | |

Equivalent spectral features can also be achieved using a single continuously thickness graded stack of polymeric layers, and the LWBE can be adjusted to any value from 420 to 440 nm.

Extension of the reflection spectrum to 440 nm is an optimum tradeoff of eye protection and minimizing the coloration of the lens. In particular, the 440 nm wavelength was chosen since it is below the peak wavelengths of most blue LEDs. Most LED based lighting is powered by blue LEDs with yellow (or green and red) emitting phosphors. The Blue LEDs used in lighting have peak emission at a wavelength near 455 or 460 nm so a reflector that blocks blue light up to 440 nm will block only a minor portion of the blue LED emission spectrum. While there may not be much danger of macular degeneration from indoor lighting, the same glasses may be conveniently worn indoors and also outdoors in sunlight. In particular, the 440 nm limit enables a useful color balancing arrangement with a yellow blocking film as described below.

Example 3

Narrowband Yellow Light Reflector

Figure 6:
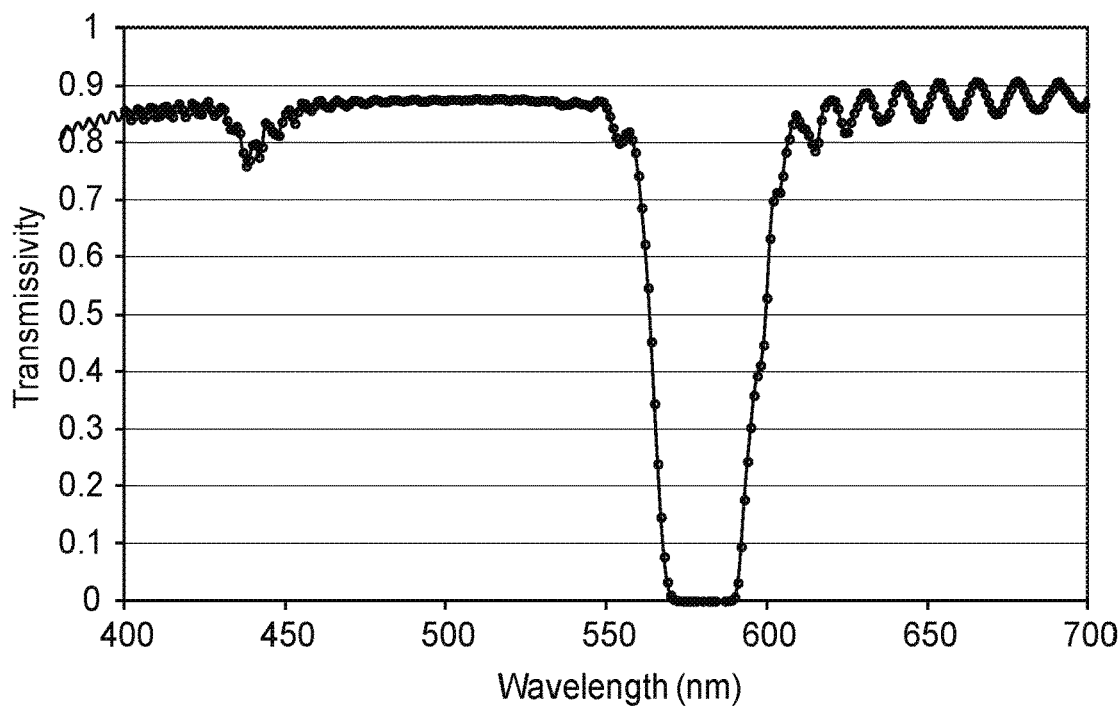
FIG. 6 is a graph of the measured transmission spectrum of a multilayer optical film having a reflection band blocking yellow light

A narrow band reflector of yellow light has been found to be useful in eyewear for enhancing the color of objects and images. A multilayer stack of 275 layers was formed with the same method described above and in Example 1 to give a 3rd order reflectance band centered near 580 nm with a FWHM of about 35 nm (564 nm to 599 nm) shown in FIG. 6. The sharp band edges permit a band of very good blockage with less than 1% average transmission from 568 to 592 nm which yields a 1% floor of 24 nm in width, compared to the FWHM value of 35 nm. The 50% transmission values for the short and long wave band edges are within 4 nm and 7 nm of the respective edges of the 1% floor. Due to its narrow value of both FWHM and the full width at 90% Max (FW90M) of 49 nm, it reflects or blocks very little green or red light and provides for enhanced color viewing when used by itself in eyewear. 90% max in this case would be near a measured transmission in air of about 79% since the maximum % T in air is about 88%. With this filter alone, blue objects and images appear to be a brighter blue and red objects and images appear to be a brighter and more saturated red color. Most yellow colored objects were only slightly changed in color since most yellow dyes and pigments transmit light from about 500 to 700 nm. A weak 4th order reflection band is visible near 450 nm but this produced no substantial coloring effect.

Further spectral details are given in Table 3.

TABLE 3

| | bandwidth | Avg Transmissivity | SWBE (nm) | LWBE (nm) |
|---|---|---|---|---|
| FWHM | 35 | 0.105 | 564 | 599 |
| 5% floor | 29 | 0.047 | 565 | 594 |
| 2% floor | 26 | 0.021 | 567 | 593 |
| 1% floor | 24 | 0.010 | 568 | 592 |

The desired bandwidth and transmission of the yellow reflection band depend on the desired color transmission of the eyewear. The optimum range for reflection is between 560 and 600 nm. In general, a narrow band with FWHM of 30, 35, or 40 nm provides a pleasing color for both indoor and outdoor viewing, as well as accentuating the blue and red colors.

Besides the use of this filter alone in eyewear, this yellow reflector is useful for providing a white color balance with the blue blocking films described herein. The yellow band reflector can be laminated to, or coextruded with, a blue or violet reflector, such as those illustrated in Examples 1, 2, 5 and 6. Lamination of separately fabricated films can be accomplished using an optically clear adhesive such as e.g. OCA 8171 from 3M Co, St. Paul, Minn.

Example 4

Figure 7:
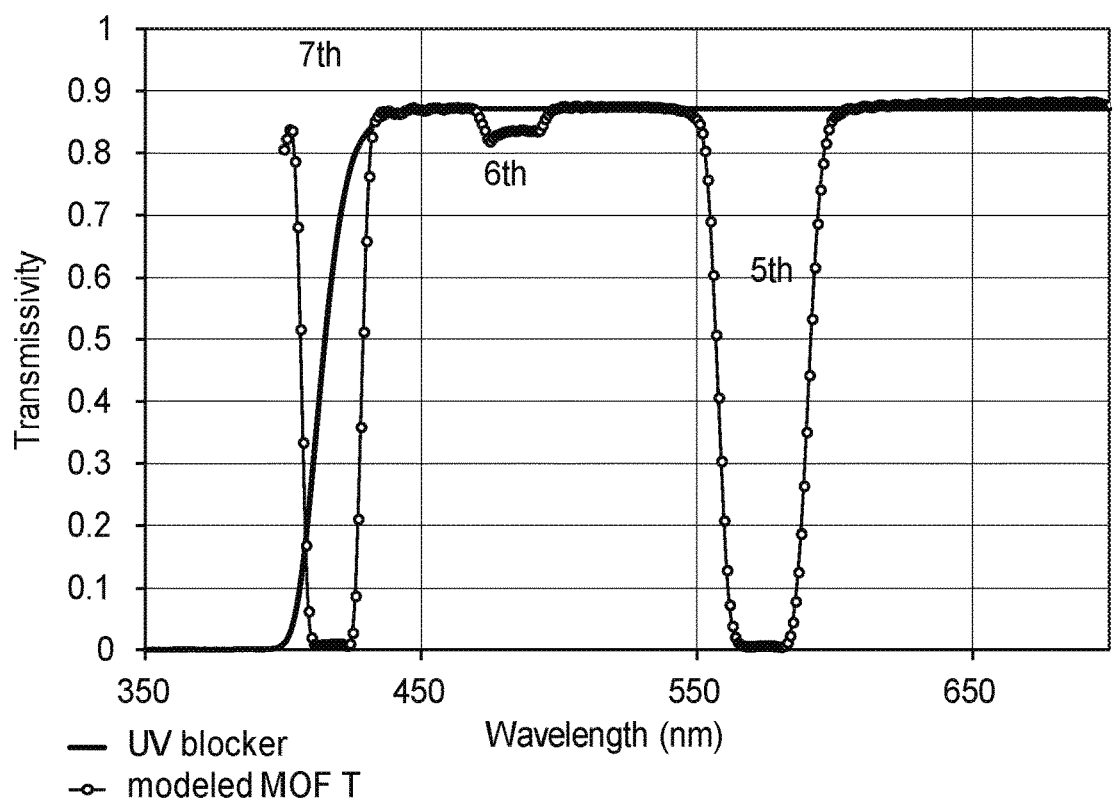
FIG. 7 is a graph of the modeled transmission spectrum of a multilayer optical film having $5^{th}$ order harmonic reflection band centered near 575 nm and a $7^{th}$ order reflection band with an edge near 425 nm and a UV absorbing dye absorbing light less than 425 nm.

420 nm Edge Filter with Violet and Yellow Reflection Bands with a Red Shifted UVA A computer modeled spectrum of an infrared reflector (modeled MOF T curve) having a 5th order harmonic reflection band centered near 575 nm and a 7th order reflection band with a LWBE near 425 nm is plotted in FIG. 7. The modeled assumed a stack of 223 alternating layers of oriented PET and coPMMA as described above. The f-ratio for the infrared stack was set at 0.5, which caused a small $6^{th}$ order harmonic to appear due to the different index dispersions of PET and the coPMMA. The f-ratio can be adjusted to reduce the $6^{th}$ order reflection peak. Wavelengths shorter than 410 nm can be absorbed with dyes such as a red shifted UVA. The dye spectrum plotted is for a UVA labeled as "UV blocker", a red shifted benzotriazole. It is referenced in U.S. Pat. No. 6,974,850, and is specifically benzotriazole 2-(2-hydroxy-3-alpha-cumyl-5-t-octylphenyl)-5-trifluoromethyl-benzotriazole. It was supplied by Ciba Specialty Chemicals. A small leak centered near 405 nm can be reduced by the use a different dye, or a heavier loading of this dye. When the plotted dye and filter spectra are multiplied to give the total transmission of these absorptive and reflective components, the peak transmission at 406 nm is 6.1%.

Spectral details of the $7^{th}$ order violet reflecting band and its composite spectrum with the UVA are given in Table 4a. The average transmission from 400 to 425 nm is less than 2%. This value could be reduced by using a dye with a slightly longer wavelength edge.

TABLE 4a

| | bandwidth | Avg Transmissivity | SWBE (nm) | LWBE (nm) |
|---|---|---|---|---|
| FWHM | 23 | 0.101 | 406 | 429 |
| 5% floor | 20 | 0.050 | 407 | 427 |
| 2% floor | 17 | 0.018 | 409 | 426 |
| 1% floor | 15 | 0.011 | 410 | 425 |
| Composite | 400-425 | 0.018 | | |

The sharp band edge of the $7^{th}$ order band results in almost full transmission of the blue spectrum for a viewer using this film and most of the violet light is blocked (1.95% average transmission from 400 to 420 nm). The modeled filter has 2.5% transmission at 425 nm and 74% T as 431 nm.

The $5^{th}$ order reflection band in the yellow is useful for producing enhanced blue and red colors as discussed for the yellow reflector of Example 3. Spectral details of this $5^{th}$ order yellow reflector are given in Table 4b.

TABLE 4b

|  | bandwidth | Avg Transmissivity | SWBE (nm) | LWBE (nm) |
|---|---|---|---|---|
| FWHM | 34 | 0.096 | 557 | 591 |
| 5% floor | 30 | 0.053 | 559 | 589 |
| 2% floor | 25 | 0.021 | 561 | 586 |
| 1% floor | 21 | 0.010 | 563 | 584 |

Example 5

440 nm Edge Filter with Absorber and $3^{rd}$ Order Reflection Band

In the eyewear industry yellow colored lenses are not commonly used except, for example, for pilots and sportsmen desiring a reduction in perceived atmospheric haze or for a sharper focus within the eye. Those yellow lenses typically block most or all of the blue light, which is not desirable for good color perception of objects and images. Blocking only the shorter blue light wavelengths, such as only 400 to 440 nm can also result in an undesirable yellow appearance depending on the light source. When the dye is incorporated in the bulk of a lens at given dye loading, the magnitude of the yellow hue and the edge cutoff wavelength (e.g. wavelength at 1% T) will depend on the thickness of the lens. Lenses come in many thicknesses, resulting in variable cutoff wavelengths so this can be a problem for lens providers. Furthermore, when viewed on edge the lenses can appear to be a very dark yellow due to the approximately 5 cm path length from edge to edge on a typical eyewear lens. Coating the dye in a thin layer onto the lens, or onto a separate substrate such a polymer sheet or a polymeric interference filter will eliminate the latter problem of viewing a yellow lens on edge. Multilayer interference blue reflectors also get less yellow when viewed at oblique incidence angles compared to normal incidence. When viewed from the edge, a blue reflecting multilayer stack will impart no color to the lens. Therefore a combination of a coated dyed layer and a longer wavelength blocking interference filter will reduce the unwanted coloration of lenses due to blocking some of the blue light, compared to blocking the same amount of blue light using only a dye incorporated within the bulk of a lens. The presence of the yellow dye will guarantee that the deepest blue light will be blocked at all angles of incidence. Thus there is good reason to provide the blue blocking functionality of a lens with a combination of a thin dye layer with an interference reflector. A dye layer is considered to be thin if it is incorporated in a film or coated layer that is less than 0.5 mm thick, and preferably less than 0.25 or 0.1 mm thick. For example, the dye could be incorporated into the 0.25 mm think polycarbonate layers or in the 25 micrometer thick adhesive layers of Example 9 below. The multilayer polymeric interference films in these examples are approximately 0.1 mm thick.

Figure 8:
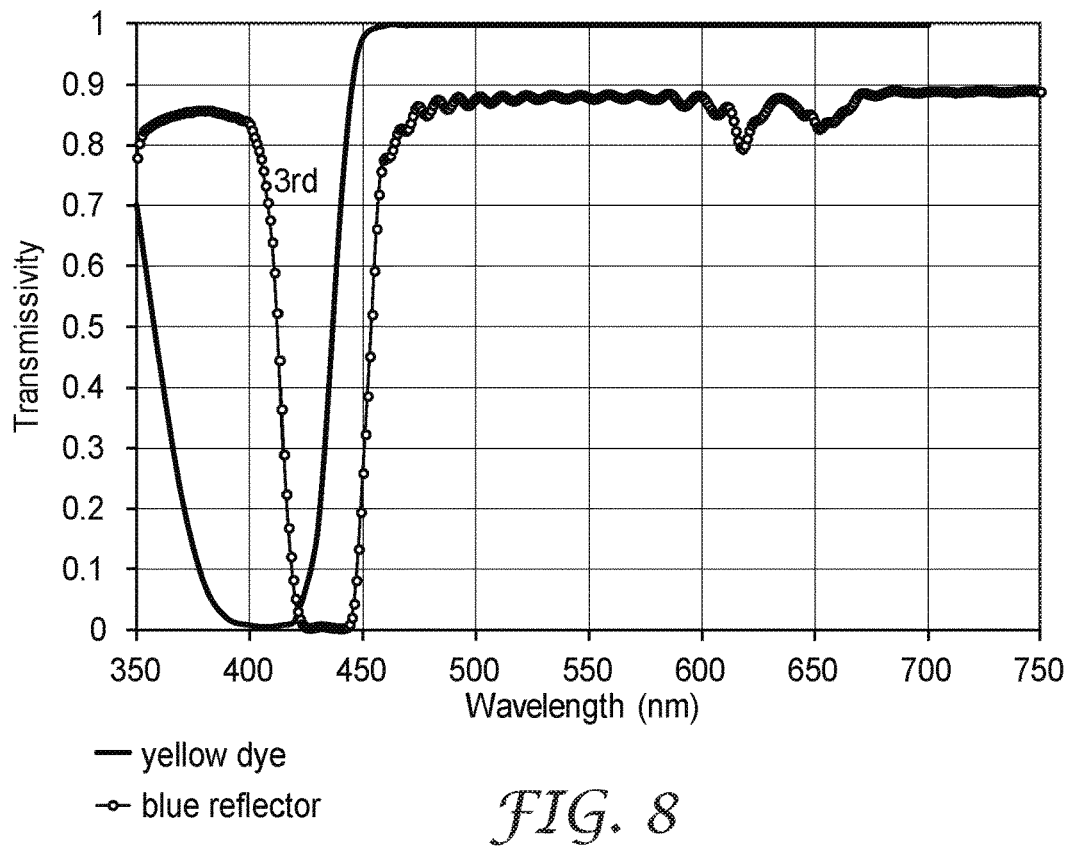
FIG. 8 is a graph of the measured transmission spectrum of a multilayer optical film having $3^{rd}$ order harmonic reflection band with a long wave band edge (LWBE) near 440 nm with an absorbing dye absorbing shorter blue and violet wavelengths.

Example 5 illustrates such a combination as shown by the two spectra in FIG. 8. In this example a reflector with 223 layers was formed to provide for a third order reflection band in the blue (blue reflector), with a LWBE near 440 as illustrated by the measured spectrum plotted in FIG. 8. Data for a yellow dye supplied by HW Sands Corporation (SDB 7040) was adapted to provide the dye transmission spectrum (yellow dye) in FIG. 8 that blocks the shorter blue and violet wavelengths. For color balance, the yellow reflector of Example 3 can also be laminated or co-extruded with this reflector.

The floor ranges and average transmission values are given in Table 5. At the bottom of table 5 the average transmission values of the composite absorber/reflector are given for the ranges of 400 nm to the 1% and 2% floor LWBE's and for 400 to 440 nm.

TABLE 5

|  | bandwidth | Avg Transmissivity | SWBE | LWBE |
|---|---|---|---|---|
| FWHM | 23 | 0.093 | 413 | 453 |
| 5% floor | 20 | 0.044 | 416 | 450 |
| 2% floor | 17 | 0.019 | 419 | 448 |
| 1% floor | 15 | 0.010 | 420 | 446 |
| Composite | 400-448 | 0.057 |  |  |
| Composite | 400-446 | 0.004 |  |  |
| Composite | 400-440 | 0.002 |  |  |

The composite film has a very low average transmission of 0.2% from 400 to 440 nm.

Example 6

440 nm Edge Filter with Absorber and $5^{th}$ Order Reflection Band

Figure 9:
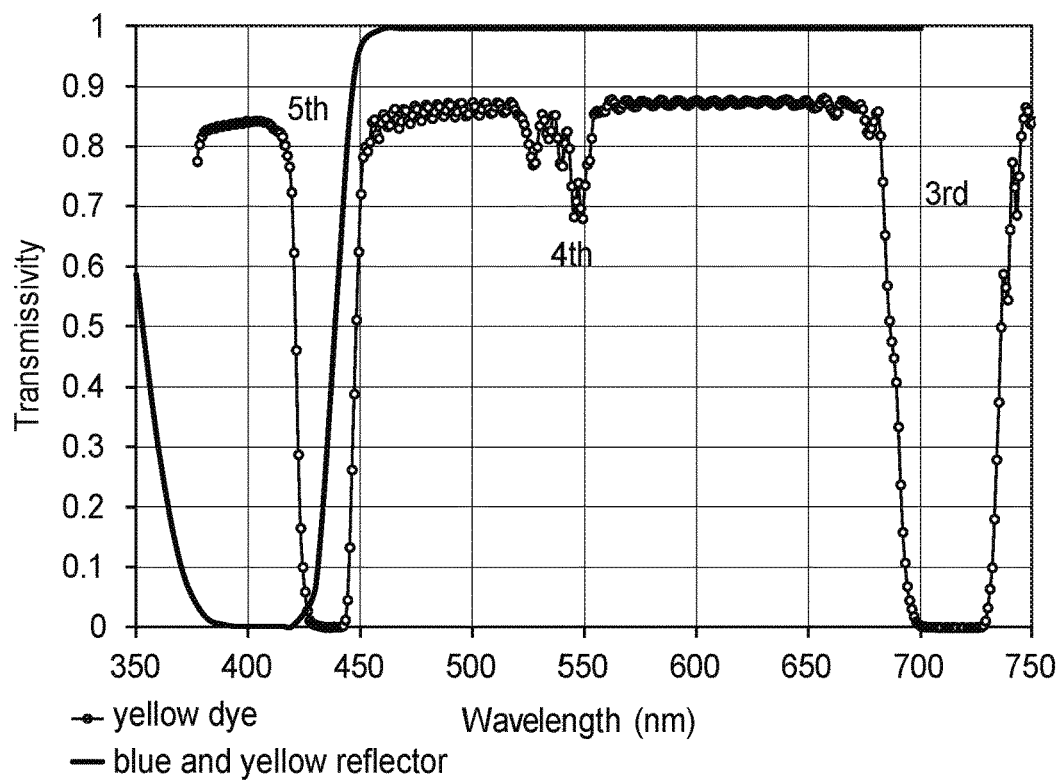
FIG. 9 is a graph of the measured transmission spectrum of a multilayer optical film having $5^{th}$ order harmonic reflection band with a long wave band edge (LWBE) near 440 nm with an absorbing dye absorbing shorter blue and violet wavelengths.

Various order reflection bands can be used in conjunction with the dye layer of Example 5, provided they have a relatively sharp band edge. Transmission data of a multilayer stack (blue reflector) is plotted in FIG. 9. In particular, it is a stack with a $5^{th}$ order harmonic band having a LWBE near 440 nm. This stack was formed in the same process as for Example 3. The film design of Example 3 was simply made thicker so as to move the $3^{rd}$ order reflection out to the edge of the visible range and the $5^{th}$ order band up into the blue region. The yellow reflector of Example 3 could be added to this construction to provide a better white balance for the transmitted light. The data for the yellow dye (yellow dye) of HW Sands Corporation (SDB 7040) was adapted to illustrate a higher concentration to move the blue blocking to longer wavelengths as the $5^{th}$ order band is narrower than the $3^{rd}$ order band plotted in Example 5.

The third order band reflects some light in the far red, but this will have only a small impact on the color of a lens at normal viewing angles of the person wearing the glasses. At high angles of view, an observer will notice bright red and green colors from the $3^{rd}$ order band, which will provide a decorative appearance to the lenses.

TABLE 6

|  | bandwidth | Avg Transmissivity | SWBE | LWBE |
|---|---|---|---|---|
| FWHM | 27 | 0.089 | 421 | 448 |
| 5% floor | 26 | 0.045 | 420 | 446 |
| 2% floor | 23 | 0.019 | 422 | 445 |
| 1% floor | 21 | 0.009 | 423 | 444 |
| Composite | 400-446 | 0.025 |  |  |
| Composite | 400-445 | 0.016 |  |  |
| Composite | 400-444 | 0.009 |  |  |
| Composite | 400-440 | 0.002 |  |  |

Example 7

Figure 10:
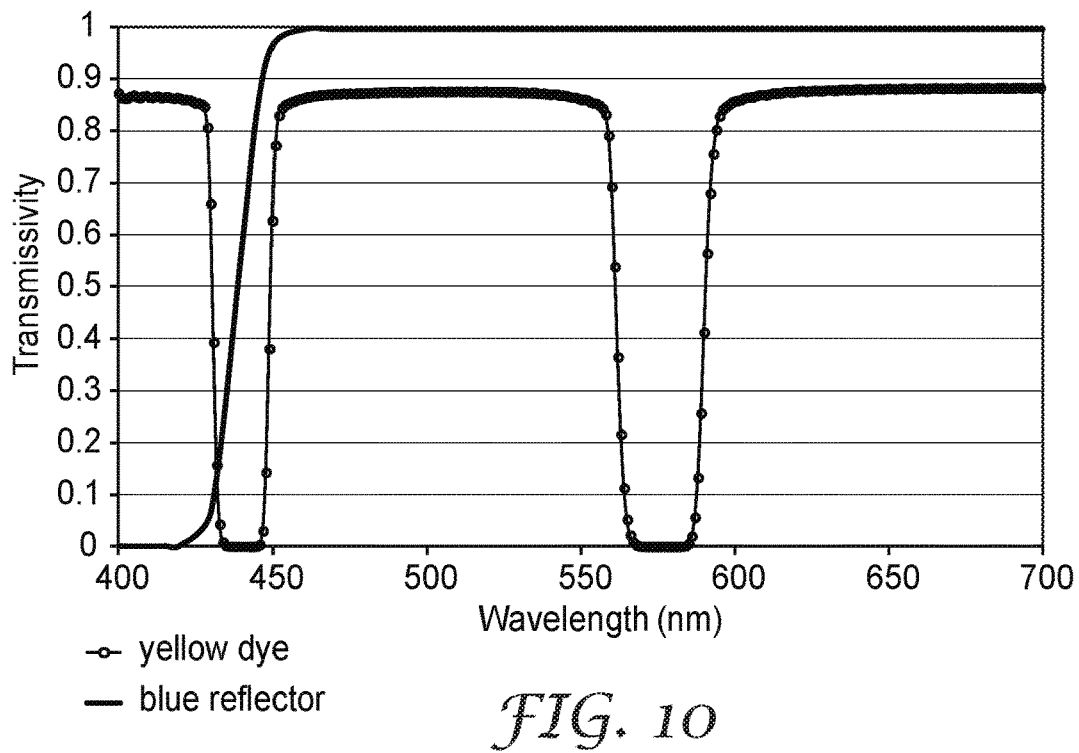
FIG. 10 is a graph of the modeled transmission spectrum of a multilayer optical film having $4^{th}$ order harmonic reflection band with a long wave band edge (LWBE) near 440 nm and a third order harmonic reflection band centered near 575 nm and having a FWHM of 29 nm and with an absorbing dye absorbing shorter blue and violet wavelengths.

440 nm Edge Filter with Absorber and $3^{rd}$ and $4^{th}$ Order Reflection Bands Instead of adding a separate yellow interference filter stack for color balance as in Examples 5 and 6, a yellow reflection band can be created with the same stack that creates the blue reflection band in the multilayer stack. The reflector spectrum (blue and yellow reflection bands) plotted in FIG. 10 was calculated for a 275 layer stack of PET and co-PMMA having an f-ratio of 0.835. The first order band is centered near 1700 nm. The thickness values were adjusted so the LWBE of the 4$^{th}$ order reflectance band would be near 440 nm, with the sharp band edge providing for low transmission at 440 nm. The transmission of this band edge at 450 nm is 63% and the transmission at 440 nm is 0.01%. The 3$^{rd}$ order reflectance band is centered near 575 nm and has a FWHM of 29 nm. The long wavelength band edge of the 4$^{th}$ harmonic transitions from 5% T to 80% T in only 4 nm with 62% T at 450 nm. A slightly longer wavelength yellow dye (yellow dye) could be used if the small leak near 430 nm is objectionable.

The spectral details of this reflector and composite blocker are given in Table 7a and more details of the 3$^{rd}$ order yellow reflector are given in Table 7b.

TABLE 7a

|  | bandwidth | Avg Transmissivity | SWBE | LWBE |
| --- | --- | --- | --- | --- |
| FWHM | 19 | 0.090 | 431 | 450 |
| 5% floor | 18 | 0.061 | 431 | 449 |
| 2% floor | 16 | 0.023 | 432 | 448 |
| 1% floor | 14 | 0.006 | 433 | 447 |
| Composite 2% edge | 400-448 | 0.015 |  |  |
| Composite 1% edge | 400-447 | 0.012 |  |  |
| Composite | 400-440 | 0.014 |  |  |

TABLE 7b

|  | bandwidth | Avg Transmissivity | SWBE | LWBE |
| --- | --- | --- | --- | --- |
| FWHM | 29 | 0.073 | 561 | 590 |
| 5% floor | 27 | 0.045 | 562 | 589 |
| 2% floor | 25 | 0.024 | 563 | 588 |
| 1% floor | 23 | 0.012 | 564 | 587 |

The composite transmission values can be lowered to less than 1% by using a yellow dye with a slightly longer wavelength range.

Example 8

Blue and Violet Absorber with Color Balancing Yellow Reflector

Figure 11:
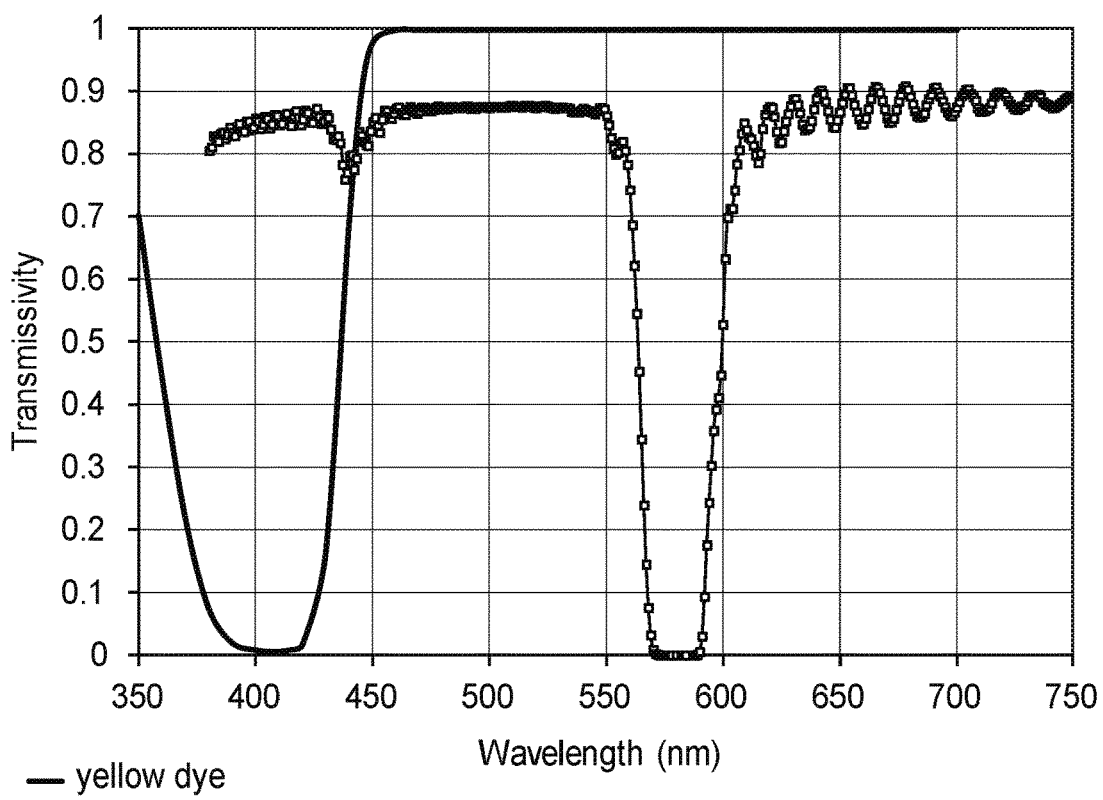
FIG. 11 is a graph of the measured transmission spectrum of a multilayer optical film having $3^{rd}$ order harmonic reflection band centered near 580 nm with an absorbing dye absorbing shorter blue and violet wavelengths.

A dye alone can be used to block violet and blue light up to 440 nm, even though the band edge near 440 nm will not be as sharp as that of the preceding examples and more shorter wave blue light will leak through. However, the construction is simpler. As described above, this dye could be incorporated in a thin coating on a polymer substrate such as a polymeric edge interference filter such as the yellow reflector of Example 3, or incorporated into one of the other thin polymeric layers of the lens construction. The spectrum of the dye (yellow dye) of Example 5 is plotted in FIG. 11 along with the spectrum (yellow reflector) of the yellow reflector of Example 3. Using the methods of standard color theory, the yellow reflector can be constructed so as provide the optimum color balance. In general, it should reflect light within the wavelength range between 550 and 620 nm. The optimum range is between 560 and 600 nm. Precise bandwidths and transmission within the yellow reflection band depend on the desired color transmission of the eyewear.

The blue light transmission for several wavelength ranges are given in Table 8.

TABLE 8

|  | averaging range | Avg Transmissivity |
| --- | --- | --- |
| Yellow dye | 400-420 | 0.009 |
| Yellow dye | 400-430 | 0.032 |
| Yellow dye | 400-440 | 0.114 |

The spectral details of the color balancing yellow reflector are given above in Table 3.

Using the standard CIE color metrics, the color coordinates x and y of the light transmitted by any of the color filters described herein can be calculated. For the following color calculations we assume a D65 color source (sunlight). The Y (luminance) value of a lens or other optical component is equal to 100 when all visible wavelengths of that source are 100% transmitted. The color coordinates for such a clear component (the white point) are x=0.3127 and y=0.3290. If a lens component is added that blocks all light with wavelengths from 400 to 440 nm, the color coordinates are changed to x=0.3316 and y=0.3711 and Y=99.74. This is a slightly yellow color and the high value of Y is due to the low photopic weighting values for deep blue light. Adding a yellow reflector which blocks all light with wavelengths from 564 to 599 (FWHM=35 nm), in addition to the blue blocking filter, the color coordinates change to a light cyan with x=0.2829 and y=0.3421. This yellow reflector blocks approximately the same amount and color of light as the yellow reflecting filter in Example 3. The luminance value Y drops to 72.89. For a better white balance, a slightly narrower reflector can be chosen for combination with the 400 to 440 blocking filer. Assume it has a FWHM of 29 nm and blocks all light from 560 to 589 which gives it a band center near 575 nm. The color coordinates of this composite filter are x=0.3013 and y=0.3385, which are close to the original white point. The luminance Y=75. Although the examples given herein do not have perfectly square edges as assumed for these calculations, their sharp band edges enable a close white balance if their FWHM values are slightly modified.

Example 9

Incorporation of Film into Eyewear

A narrowband multilayer reflector 1010 was constructed identical to that of Example 3 except the layers were all shifted thinner so that the reflection band was centered near 550 nm. The film was approximately 90 micrometers thick. These films were produced with a soft poly "cling" liner that is laminated just before the winder at the end of the film making process. Incorporation of this filter into a polycarbonate lens 100 was accomplished in the following manner.

Figure 12:
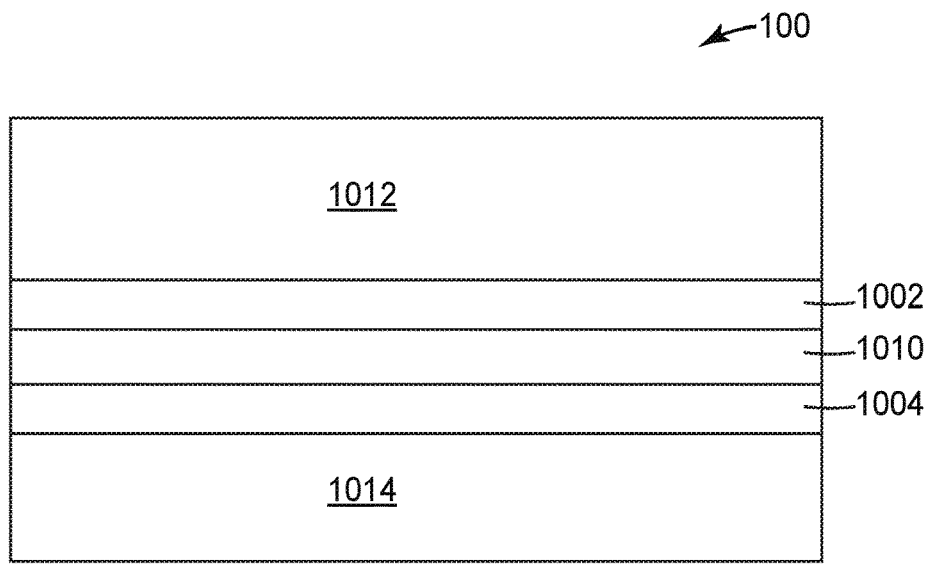
FIG. 12 is a schematic diagram cross-sectional view of an illustrative 5-layer laminate lens.

A roll of 250 micrometer thick polycarbonate 1012, 1014 from Sabic Corporation (HP92X PC) was first laminated to a layer of 25 micrometer thick optically clear adhesive 1002, 1004 (OCA 8171 from 3M Co) using a standard roll to nip roll laminator. The OCA is supplied between two polyester release liners and the polycarbonate (PC) is supplied with a soft poly liner on one side. The "easy" liner was removed from the OCA to expose one side of the adhesive just prior to the laminating nip. The non-liner side of the PC was laminated to the OCA in the first laminating pass. The output from this pass was a roll of PC/OCA with liners on each of the outer surfaces. This was done twice to produce two identical rolls of PC/OCA. The next step was to put a roll of the PC/OCA onto the top unwind of the laminator and a roll of the multilayer reflector film onto the bottom unwind. The "tight" liner on the OCA was removed from the PC/OCA roll to expose the adhesive just prior to the laminating nip. The non-liner side of the multilayer optical film (MOF) roll was laminated against the OCA in this pass. Then this laminate output (PC/OCA/MOF) was taken off the output spindle and put back onto the bottom unwind. On the next pass, the liner on the MOF roll was removed and the PC/OCA on the top unwind was laminated to the bare MOF side to complete the 5-layer laminate shown in FIG. 12.

This lens 100 construction includes a polymeric interference filter 1010, as described herein, sandwiched between two polymeric substrates 1012, 1014 and fixed to the two polymeric substrates 1012, 1014 with adhesive 1002, 1004. The lens 100 can optionally include a polarizer and one or more dyes, as described above. In many of these embodiments the lens laminate has a thickness of 2 mm or greater.

Figure 13A:
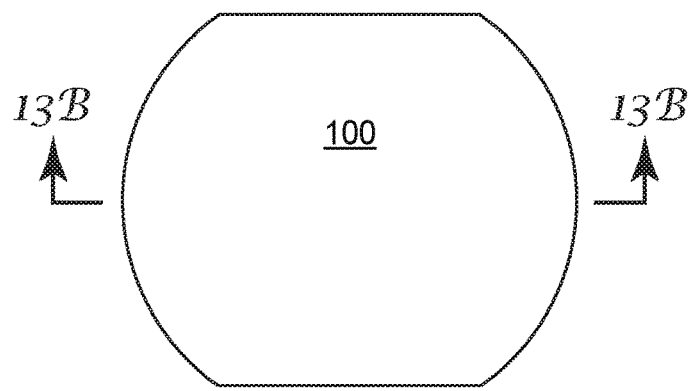
FIG. 13A is a schematic diagram front view of the illustrative lens of FIG. 12.
Figure 13B:
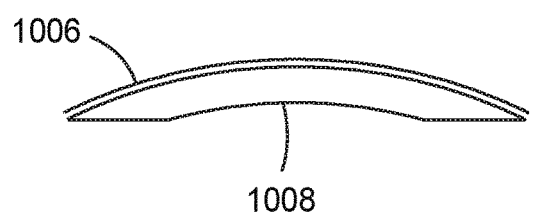
FIG. 13B is a schematic diagram side view of the illustrative lens of FIG. 12.

The lens 100 construction or laminate can then be thermoformed into spherically curved "wafers" to be used as a base for injection molding against molten polycarbonate. The radius of curvature is typically in the range of 60 to 120 mm. In a standard eyewear process, the wafer is shaped by sagging into a mold at elevated temperatures. However, care must be taken with polyester based films to prevent them from shrinking when they are thermoformed into such shapes since the required temperature is at or above 200° C. Significant shrinkage of the oriented polyester can occur at such temperatures. During the thermoforming process, the laminate of FIG. 12 was clamped on all four edges, inserted into a preheating oven for 2 minutes at 205° C. The film was quickly withdrawn from the oven and pressed against an aluminum mold with vacuum on one side and air pressure on the other side. The mold was pre-heated to 150° C. The mold was 75 mm in diameter and the exposed surface was machined with a spherical shape with a convex radius of curvature of 88 mm. After the formed laminate was cooled to the temperature of the mold, it was separated from the mold and trimmed to the spherically curved shape illustrated in FIG. 13A and FIG. 13B, having an inner surface 1008 and an outer surface 1006.

Polycarbonate lens material was then injected molded against this wafer in a standard insert mold process which does not clamp or otherwise constrain the wafer on the edges to prevent shrinking. It was not known if the wafer with the polyester filter would shrink due to the high temperatures of the molten polycarbonate (approx. 275° C.). However, injection molded lenses of about 2 mm thickness with the PC/film laminate on the convex side were successfully made with this process. The thick PC laminate apparently insulates the polyester well enough from the hot PC resin to prevent substantial shrinkage during this process. The 75 mm diameter lenses were then trimmed with standard lens trimming machinery for incorporation into eyewear frames.

Thus, embodiments of BLUE EDGE FILTER OPTICAL LENS are disclosed. One skilled in the art will appreciate that the optical films and film articles described herein can be practiced with embodiments other than those disclosed. The disclosed embodiments are presented for purposes of illustration and not limitation.

What is claimed is:
1. An optical lens for eyewear, the optical lens comprising:
   a curved polymeric substrate; and
   a polymeric interference filter disposed on the curved polymeric substrate, the polymeric interference filter reflecting blue light at all wavelengths in a range from 400 nm to 420 nm and transmitting at least 50% of blue light having a wavelength greater than 430 nm.

2. The optical lens according to claim 1, wherein the polymeric interference filter transmits at least 70% of blue light having a wavelength greater than 420 nm.

3. The optical lens according to claim 1, wherein the polymeric interference filter transmits less than 2% of blue light at all wavelengths in a range from 400 nm to 420 nm.

4. The optical lens according to claim 1, wherein the polymeric interference filter is a polymeric multilayer optical film.

5. The optical lens according to claim 1, wherein the optical lens blocks yellow.

6. The optical lens according to claim 1, further comprising a yellow light absorbing material.

7. The optical lens according to claim 1, further comprising a yellow light reflecting polymeric interference filter.

8. The optical lens according to claim 1, wherein the polymeric interference filter is a polymeric multilayer optical film comprising a plurality of alternating layers of polyester and an acrylic polymer.

9. The optical lens according to claim 1, wherein the polymeric interference filter is a polymeric multilayer optical film comprising a plurality of alternating layers of PET and coPMMA.

10. An optical lens comprising:
   a curved polymeric substrate;
   a polymeric interference filter disposed on the curved polymeric substrate;
   wherein the polymeric interference filter comprises a polymeric multilayer optical film and having an average light transmission of less than 2% across a band comprising blue light and having a short wavelength band edge of about 400 nm or less and a long wavelength band edge in a range from 420 nm to 440 nm and substantially transmits blue light having a wavelength that is at least 10 nm greater than the wavelength of the long wavelength band edge.

11. The optical lens according to claim 10, wherein the polymeric multilayer optical film reflects at least 99% of all blue light in a range from 400 nm to 420 nm and transmits at least 50% of all blue light greater than 450 nm.

12. The optical lens according to claim 10, wherein the polymeric multilayer optical film reflects at least 99% of all blue light in a range from 400 nm to 420 nm and transmits at least 70% of all blue light greater than 450 nm.

13. The optical lens according to claim 10, further comprising a yellow light absorbing material.

14. The optical lens according to claim 10, further comprising a yellow light reflecting polymeric interference filter.

15. The optical lens according to claim 10, wherein the polymeric multilayer optical film comprises a plurality of alternating layers of polyester and an acrylic polymer.

16. The optical lens according to claim 10, wherein the polymeric multilayer optical film comprises a plurality of coextruded alternating layers of PET and coPMMA.

17. Eyewear comprising the optical lens according to claim 10.

* * * * *